United States Patent [19]

Wong

[11] Patent Number: 4,667,005
[45] Date of Patent: May 19, 1987

[54] CRYSTALLINE ALPHAMONOOLEFIN COPOLYMERS

[75] Inventor: Pui K. Wong, Katy, Tex.

[73] Assignee: Shell Oil Company, Houston, Tex.

[21] Appl. No.: 812,421

[22] Filed: Dec. 23, 1985

[51] Int. Cl.[4] .............................................. C08F 12/32
[52] U.S. Cl. .................................... 526/284; 526/159
[58] Field of Search ................................ 526/284, 308

[56] References Cited

U.S. PATENT DOCUMENTS

| | | | |
|---|---|---|---|
| 3,497,483 | 2/1970 | Ketley | 260/79.5 |
| 4,414,132 | 11/1983 | Goodall et al. | 502/169 |
| 4,540,763 | 9/1985 | Kirchhoff | 526/281 |

OTHER PUBLICATIONS

Lloyd et al., Tetrahedron 1964, 20, 2185–2194.
Lloyd et al., Tetrahedron 1965, 21, 2281–2288, 245–254.
Lloyd et al., Tetrahedron 1965, 21, 245–254.
Hubert et al., J. Chem. Soc. 1965, 3160–3169.
Schiess, Tetrahedron Lett. 1978, 46, 4569–4572.
Klundt, Chem. Rev. 1970, 70(4), 471–487.
Ewing et al., J. Chem. Soc., Chem. Commun. 1979, 207–208.
Gray et al., J. Am. Chem. Soc. 1978, 100, 2892–2893.
Harruff et al., J. Am. Chem. Soc. 1978, 100, 2893–2894.
Aalbersberg, Tetrahedron Lett. 1979, 22, 1939–1942.
Boekelheide et al., Tetrahedron Lett. 1978, 4245–4248.
Boekelheide, Topics in Current Chem. 1983, 113, 100–104.
Perkins et al., Angew. Chem. Int. Ed. Engl. 1978, 17(8), 615–616.

*Primary Examiner*—Paul R. Michl

[57] ABSTRACT

Solid copolymers of $C_2$–$C_8$ alphamonoolefins and an olefinic benzocyclobutene monomer of the formula

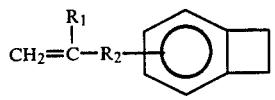

where $R_1$ is hydrogen or $CH_3$ and $R_2$ is $-(CH_2)_n-$ where n is 0 to 6 are claimed. Such copolymers can be easily crosslinked at temperatures above about 200° C., resulting in improved dimensional stability above the melting temperatures.

45 Claims, No Drawings

4,667,005

CRYSTALLINE ALPHAMONOOLEFIN COPOLYMERS

FIELD OF THE INVENTION

The present invention relates broadly to alphamonoolefin copolymers and processes for preparing the same. More particularly, this invention relates to novel crystalline copolymers of alphamonoolefin monomer(s) and certain olefinic benzocyclobutene monomers.

BACKGROUND OF THE INVENTION

The polymerization of α-monoolefins to useful thermoplastic polymers by catalysis employing coordination catalysts is well known. Generally, the coordination catalysts comprise at least two compounds, one being a compound of a transition metal of groups IV–VIII of the Periodic Table, referred to herein as "procatalyst" and the other being an organometallic compound of a metal of groups I–III of the Periodic Table, referred to herein as "cocatalyst". Such coordination catalyst systems are often referred to as Ziegler catalysts. A group of these catalysts which is stereoregulating in the production of polymers of propylene and higher α-monoolefins is often referred to as Ziegler-Natta catalysts. In commercial Ziegler-Natta catalysts, the procatalyst is generally an active form of titanium chloride and the cocatalyst an alkyl- or alkyl halide compound of aluminum. These catalysts may be further modified by addition of compounds which increase the stereoregulating effect of the catalysts, referred to herein as selectivity control agents.

Polymers of ethylene, propylene, 1-butene and 4-methyl-1-pentene produced by means of such coordination catalysts are materials of commerce, both as homopolymers and copolymers.

These crystalline olefin polymers, in their usual form, have some outstanding good properties and some undesirable ones. For example, desirable properties of highly crystalline polypropylene are high tensile strength and substantial hardness. One disadvantage of the usual forms of highly crystalline polypropylene is poor creep resistance. Poor creep resistance means that such polymers are deficient for dimension stability. One means of improving creep resistance is to crosslink the polymer by peroxide. However, such crosslinking is useful only for ethylene polymers, and not propylene polymers, butene-1 polymers etc. Still further, such crosslinking techniques are also not desirable because of premature crosslinking, bubble formation, etc.

A new polymer has now been found that possesses a unique balance of properties along with a unique curing or crosslinking approach.

SUMMARY OF THE INVENTION

The present invention deals broadly with novel and non-obvious poly alpha monoolefin polymers and processes for preparing the same. In particular, the present invention relates to a solid copolymer of a $C_2$–$C_8$ alphamonoolefin and an olefinic benzocyclobutene monomer of the formula:

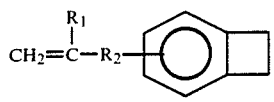

where $R_1$ is hydrogen or $CH_3$ and $R_2$ is $-(CH_2)_n-$ where n is 0 to 6. Further, the present invention also relates to a process for preparing a solid polymer, said process comprising copolymerizing a $C_2$–$C_8$ alphamonoolefin and an olefinic benzocyclobutene monomer of the formula:

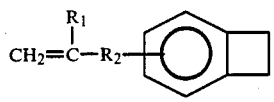

where $R_1$ is hydrogen or $CH_3$ and $R_2$ is $-(CH_2)_n-$ where n is 0 to 6, in the presence of a polyolefin coordination catalyst.

DETAILED DESCRIPTION OF THE INVENTION

Advantages of the Invention

Peroxide crosslinking of polyethylene give useful products such as cable insulations, foams, abrasion resistant profiles, coatings and bearings. These products can be prepared by a variety of processes such as extrusion, injection molding and sintering. Some of the problems exist in the peroxide curing of PE are generation of bubbles from peroxide decomposition; interference of crosslinking reactions by some stabilizer additives which are radical scavengers; and the inability to prevent curing below <170° C. limits some of the processing techniques to the lower melting LDPE only.

Peroxide crosslinking of substituted polyolefins are generally not feasible because hydrogen abstraction takes place preferentially at the tertiary carbons to give polymeric radicals which preferentially undergo β-scission than recombination.

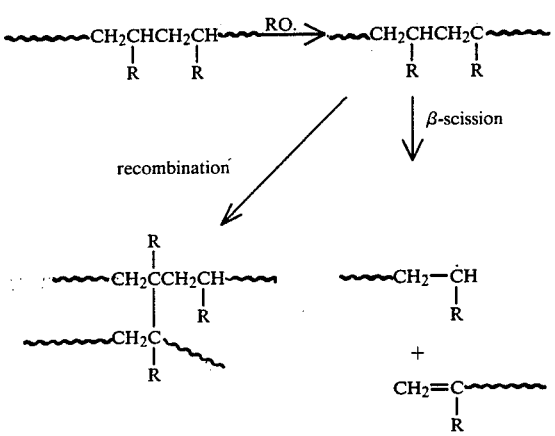

The current invention provides the following advantage over peroxide crosslinking.
1. It can be applied to substituted polyolefins such as polypropylene and poly(4-methyl-1-pentene).
2. It is not affected by stabilizers which are radical scavengers.
3. It eliminates mixing problem.

4. It eliminates the problem of bubble formation.
5. It can be applied to PE in processes which require no premature crosslinking at temperature <170° C.

Alpha-Monoolefins

This invention is suitable for the homo- and copolymerization of $C_2$–$C_8$ alpha monoolefins. Such olefins include ethylene, propylene, butene-1, 4-methyl-1-pentene, hexene-1, heptene-1, octene-1 and mixtures thereof. Preferred olefins include ethylene, propylene, butene-1 and 4-methyl-1-pentene with propylene being the most preferred alpha monoolefin monomer.

Olefinic Benzocyclobutene Monomer

The key aspect of the present invention involves the incorporation of a particular benzocyclobutene monomer in the polymerization process and the product. The olefinic benzocyclobutene monomers employed herein have the general formula:

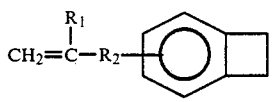

where $R_1$ is hydrogen or a $CH_3$ radical and $R_2$ is $-(CH_2)_n$— where n is 0 to 6. Preferably, $R_1$ is H and n is 0 to 2. A preferred group of olefinic benzocyclobutene monomers includes:

| Monomer | Abbreviation |
| --- | --- |
| 4-(3-butenyl)benzocyclobutene | 4BBC |
| 3-(3-butenyl)benzocyclobutene | 3BBC |
| 4-vinylbenzocyclobutene | 4VBC |
| 3-vinylbenzocyclobutene | 3VBC |
| 4-allylbenzocyclobutene | 4ABC |
| 3-allylbenzocyclobutene | 3ABC |
| 4-isopropenylbenzocyclobutene | 4IBC |
| 3-isopropenylbenzocyclobutene | 3IBC |

Of the above, the first six are preferred with 4BBC being most preferred.

As shown in Illustrative Embodiment I, the thermal electrocyclic ring-opening of such benzocyclobutene monomers is the key to their particular usefulness in the present invention. Such monomers should have very good stability up to at least 100° C. ($t_{\frac{1}{2}}=12$ years at 100° C. for benzocyclobutene) and high reactivity at elevated temperature ($t_{\frac{1}{2}}=1.5$ minutes at 250° C. for benzocyclobutene).

The relative amount of olefinic benzocyclobutene monomer depends upon the degree of "crosslinking" ultimately desired. The following table shows the preferred ranges in mole percent:

| | Preferred | More Preferred |
| --- | --- | --- |
| Alphamonoolefin monomer | 99.99 to 85 | 99.9 to 95 |
| Olefinic benzocyclobutene monomer | 0.01 to 15 | 0.1 to 5 |
| TOTAL | 100% | 100% |

Catalysts

A number of different coordination catalysts of the Ziegler-Natta type are useful in the process of this invention. Broadly, such catalysts comprise a pro-catalyst which is a solid compound of a transition metal of group IV to VIII of the Periodic Table and a cocatalyst which is an alkyl compound, including alkyl halides and hydrides, of a metal of groups I to III. It is now well known that only a limited number of these compounds are practical for effectively converting a given monomer into a desired polymer. In general, the same catalysts which are effective for the polymerization of a particular monomer feed in a conventional polymerization process are also effective for the same conversion in the process of this invention.

Zielger-Natta coordination catalysts are discussed in detail in the book "Ziegler-Natta Catalysts and Polymerizations" by John Boor, Jr., Academic Press, 1979 and in numerous patents and review articles, including those cited by Boor.

More recently, catalysts having much higher activity have been developed both for polymerization of ethylene to linear high density polyethylene and for the stereoregular polymerization of higher a-monoolefins. The most active of these catalysts comprise procatalysts composites of magnesium or manganese halide, titanium halide and, in the case of stereoregulating catalysts, an electron donor. The cocatalysts generally are aluminum trialkyls and, in the case of stereoregulating catalyst, a selectivity control agent. Such catalysts are described, for example, in U.S. Pat. Nos. 4,113,654 and 4,265,785 and many other patents for ethylene polymerization and in U.S. Pat. Nos. 4,107,413 and 4,329,253 and European Pat. Nos. 19,330 and 29,623 and many others for stereospecific polymerization of α-monoolefins.

Suitable procatalysts for conversion of propylene and other α-monoolefins to isotactic polymers are violet $TiCl_3$ and composites of titanium chloride, magnesium chloride and an electron donor. Procatalysts of the type of violet $TiCl_3$ are preferably employed with alkyl aluminum halides, typically diethyl aluminum chloride, as cocatalyst. Procatalysts of the type of composites of titanium halide, magnesium halide and electron donor are preferably employed with trialkyl aluminum, typically triethyl aluminum as cocatalyst, and with an aromatic ester electron donor, such as ethyl p-methoxybenzoate (p-ethyl anisate) or p-methyl toluate as selectivity control agent.

Other catalysts may also be employed including halides or alkoxyhalides of a transition metal such as zirconium, vanadium, chromium and molybdenum. In the active catalyst the transition metal is at a valance below its maximum. Among the halogens the order of preference runs from chlorides to bromides to iodides to fluorides.

The olefinic benzocyclobutene monomer and alpha monoolefin monomer(s) are copolymerized in a manner similar or identical to that used in the polymerization and copolymerization of alpha monoolefin monomers. These polymerizations may be carried out by any one of the conventional techniques, such as gas phase polymerization or slurry polymerization using liquid monomer or an inert hydrocarbon diluent as liquid medium. Hydrogen may be used to control the molecular weight of the polymer without detriment to the stereospecific performance of the catalyst compositions. Polymerization may be effected batchwise or continuously with constant or intermittent supply of the catalyst to the polymerization reactor(s).

Polymerization, as well as catalyst preparation, is carried out in the absence of air and water or in the presence of only very limited amounts of these, since otherwise the catalyst would be deactivated. Desired polymerization temperatures are between 20° C. and 100° C., preferably between 40° C. and 80° C.

The catalysts employed in the production of the subject copolymers may be of sufficiently high activity that no product deashing step is required. If catalyst residues are to be deactivated and removed, this may be accomplished by conventional means employed in cleanup of olefin polymers produced over such catalysts, e.g., by contact with an alcohol, followed by extraction with water.

To illustrate the instant invention, the following illustrative embodiments are given. It is to be understood, however, that the embodiments are given for the prupose of illustration only and the invention is not to be regarded as limited to any of the specific materials or conditions used in the specific embodiments.

ILLUSTRATIVE EMBODIMENT I

A key aspect of the present invention deals with the ring-opening of the benzocyclobutene monomers to reactive o-quinodimethanes. In this embodiment, half-life values for the parent benzocyclobutene are calculated and summarized in the following Table 1, based on values reported in W. R. Roth et al Chem. Ber., 111, 3892–3903 (1978). The results suggest that reactive oligomers and polymers containing benzocyclobutenes which are not substituted at the cyclobutene ring would have long shelf-life and good reactivity at >200° C.

TABLE 1

Benzocyclobutene $\xrightarrow{k}$ o-quinodimethane

| T (°C.) | k (sec$^{-1}$) | t$_{\frac{1}{2}}$ (hr) |
|---|---|---|
| 25 | 2.5 × 10$^{15}$ | 7.6 × 10$^{10}$ |
| 100 | 1.7 × 10$^{-9}$ | 1.1 × 10$^{5}$ |
| 150 | 9.6 × 10$^{-7}$ | 2 × 10$^{2}$ |
| 200 | 1.4 × 10$^{-4}$ | 1.4 |
| 250 | 7.8 × 10$^{-3}$ | 2.5 × 10$^{-2}$ |

ILLUSTRATIVE EMBODIMENT II

With the exception of polyethylene and EPDM elastomer, it is difficult to crosslink or introduce functional groups into polyolefins. By incorporating benzocyclobutene into polyolefins and using its thermal reactivity to form carbon-carbon bonds, it is possible to make new products such as crosslinkable polypropylene, thermoformable polypropylene, and high temperature ethylene-propylene elastomers. This embodiment describes the preparation of reactive polyolefins via Ziegler-Natta polymerization using 4-methylpentene-1 (4MP1) and 4-(3-butenyl)benzocyclobutene (4BBC) as model compounds.

4BBC was prepared from 4-chloromethylbenzocyclobutene in a two-step process with an overall yield of 60% as follows.

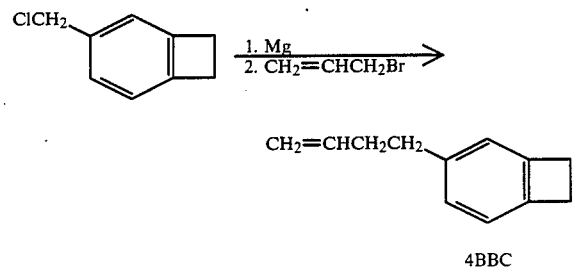

The structure of 4BBC was confirmed by $^1$H and $^{13}$C NMR. GC analysis showed it to be >99% pure.

The homo- and copolymerizations of 4MP1 and 4BBC were carried out in isooctane at 50° C. for 24 h using Stauffer TiCl$_3$.AA catalyst. The results summarized in Table 2 showed that the presence of benzocyclobutene had no deleterious effects on either polymer yields or molecular weights. The high yields of polymers regardless of monomer compositions suggest that 4BBC is not a polymerization inhibitor and should be readily copolymerizable with a wide variety of olefins. The molecular weights as measured by GPC and instrinsic viscosities were high. The GPC weight-average molecular weight of a copolymer containing 6% 4BBC was estimated to be about 1.33 million using polypropylene calibration. This value is higher than those of commercial polyolefins since no MW control agents was used in the polymerization.

$^{13}$C analysis of 4BBC homopolymer shows twelve carbon resonances whose chemical shifts are consistent with the 4BBC repeating unit. This confirms that benzocyclobutene is stable under ordinary Ziegler-Natta polymerization conditions. The chemical shifts of the backbone carbons of 4BBC homopolymer are δ31.9 and 39.4 ppm, whereas the values of corresponding carbons in the products from copolymerization are δ32.6 and 41.6 ppm. The difference suggests that copolymerization produced random copolymers rather than block polymers or mixtures of two homopolymers. The nearly identical monomer and copolymer compositions shown in Table 2 are also consistent with a random copolymerization process. The formation of copolymer was also supported by the formation of crosslinked copolymers containing as low as 0.5% m of 4BBC upon compression molding. Homopolymer of 4MP1 molded under identical conditions remained soluble in decalin.

Copolymerization with 4BBC has been shown in this embodiment to be a feasible method of producing reactive olefins containing benzocyclobutene.

TABLE 2

Polymerization of 4MP1 and 4BBC$^{(a)}$

| Polymer No. | Monomer Composition 4MP1 (%) | 4BBC (%) | Cocatalyst | Polymer Yield (%) | % 4BBC$^{(b)}$ in Copolymer |
|---|---|---|---|---|---|
| 1 | 0 | 100 | TEA | 86 | 100 |
| 2 | 100 | 0 | DEAC | 94 | 0 |
| 3 | 94.4 | 5.6 | DEAC | 93 | 6 |
| 4 | 98.7 | 1.3 | DEAC | 96 | 1.5 |
| 5 | 99.5 | 0.5 | DEAC | 93 | <1 |

$^{(a)}$TiCl$_3$/aluminum alkyl = 3; monomer/Ti = 200 in all cases except in the case of 100% 4BBC where monomer/Ti = 50.
$^{(b)}$Determined by $^{13}$C NMR.

ILLUSTRATIVE EMBODIMENT III

Isotactic poly(4-methylpentene-1) containing benzocyclobutene prepared by copolymerization of 4-methylpentene-1 (4MP1) and 4-(3-butenyl)benzocyclobutene (4BBC) is discussed in Illustrative Embodiment III. The copolymer is crystalline and can be crosslinked by compression molding. Since the performance of crystalline polymers are greatly affected by morphology which in turn is determined by thermal properties and history, it is important to understand how crosslinking affects the properties and structures of polyolefins. This embodiment describes the effect of crosslinking on the crystallinity, T$_m$, and T$_g$ of reactive poly(4MP1).

The effect of crosslinking on the melting behavior of a series of copolymers containing up to 5.6% m of 4BBC was studied by differential scanning calorimetry. The samples were heated to 300° C., held at 300° C. for 10 min to insure complete reaction of benzocyclobutene, quench cooled, and reheated to 300° C. The results in Table 3 showed that crosslinking caused decreases in crystallinity, ranging from ~35% reduction in 0.5% 4BBC copolymer to >90% in 5.6% copolymer. Control experiments showed that noncrosslinkable poly(4MP1) and a copolymer containing 4-phenylbutene-1 (4PB1) did not become less crystalline under identical heat treatment.

The DSC melting transitions of the crosslinked copolymers were broad and each contained a relatively sharp and higher melting component whose $T_{max}$ was essentially identical to that of the as prepared polymer.

Dynamic Mechanical analysis showed that crosslinking caused increases in $T_g$ from 52° C. for the homopolymer to 54.5° C. for 0.5% 4BBC copolymer, 58° C. for 1.3% and 68.5° C. for 5.6%. The possibility that the increase in $T_g$ was due to compositional change was eliminated by the decrease in $T_g$ from 52° C. for the homopolymer to 46.5° C. for the noncrosslinked 1.3% 4PB1 copolymer.

Contrary to a styrene-divinyl benzene system, the increase in $T_g$ was nonlinear with 4BBC concentration. The crosslinking efficiency, as measured by $T_g$ elevation for every mmol increase in 4BBC/g polymer, decreased with increasing 4BBC concentration (Table 4). A possible explanation is that higher 4BBC concentration gives higher crosslink density which leads to higher number of isolated benzocyclobutene and consequently lower crosslink efficiency. Alternatively, the lower crosslink efficiency at higher 4BBC concentration may be the result of an opposite effect of compositional change on $T_g$ since $T_g$ drops from 52° C. for poly-(4MP1) to 46.5° C. for the noncrosslinked 1.3% 4PB1 copolymer.

TABLE 3

Thermal Transitional Properties of 4MP1 Copolymers

| Polymer Composition | | | ΔH (cal/g) | | |
|---|---|---|---|---|---|
| % 4BBC | % 4PB1 | $T_m$ (°C.)[a] | 1st heat | 2nd heat | $T_g$ (°C.)[b] |
| 0 | 0 | 244.5 | 10.4 | 10.2 | 52.0 |
| 0 | 1.3 | 238.3 | 8.4 | 9.6 | 46.5 |
| 0.5 | 0 | 238.3 | 9.9 | 6.5 | 54.5 |
| 1.3 | 0 | 236.5 | 10.0 | 3.6 | 58.0 |
| 5.6 | 0 | 232.1 | —[c] | —[c] | 68.5 |

[a]DSC first heat data obtained at a heating rate of 10° C./min.
[b]Dynamic mechanical data measured at 11 Hz.
[c]1st heat peak too broad and 2nd heat peak too small to give accurate numbers.

TABLE 4

| | Crosslink Efficiencies | |
|---|---|---|
| Polymer | Reactive Group | $\Delta T_g$/Δmmol Reactive Group |
| polystyrene | 0-14% DVB | 65° C.[d] |
| poly(4MP1) | 0.5% 4BBC | 40° C. |
| poly(4MP1) | 1.3% 4BBC | 38° C. |
| poly(4MP1) | 5.6% 4BBC | 26° C. |

[d]T. G. Fox and S. Losheak, J. Poly. Sci., 1955, 15, 371.

ILLUSTRATIVE EMBODIMENT IV

To determine if the BCB crosslinking process is affected by the presence of stabilizers which scavange free radicals, equivalent amounts (1 mole per BCB) of Cyanox 2246 (5.5% w)

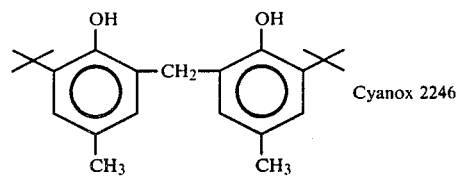

Cyanox 2246 and Galvanoxyl (6.5% w)

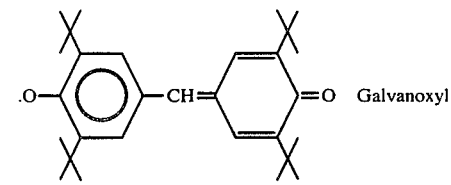

Galvanoxyl were blended with poly(4-methylpentene-1) (containing 1.3% m 4BBC), respectively, and the effect of the additives were studied by extraction and DSC. Compression molding at 250° C. gave crosslinked samples while under identical conditions P4MPI (1.3% m 4PBI) gave soluble film. Extraction with hot 1,1,2,2-tetrachloroethane gave 95% gel in the case of Cyanox 2246 and 97% gel in the case of Galvanoxyl. DSC study showed that the presence of Cyanox 2246 had no effect on the crosslinking process as evidenced by the almost identical reduction in $\Delta H_f$ after crosslinking with or without Cyanox 2246.

| | $\Delta H_f$(cal/g) | |
|---|---|---|
| | 1st Heat | 2nd Heat |
| P4MPI (1.3% m 4BBC) | 9.55 | 2.27 |
| P4MPI (1.3% m 4BBC) + 5.5% w Cyanox 2246 | 9.43 | 2.45 |

The lack of effect by the stabilizers on crosslinking suggests the BCB crosslinking does not involve free radical intermediates as in the case of peroxide crosslinking and consequently can be used with substituted polyolefins in the presence of radical scavengers.

What is claimed is:

1. A solid crystalline crosslinkable copolymer of at least one $C_2$–$C_8$ alphamonoolefin and an olefinic benzocyclobutene monomer of the formula

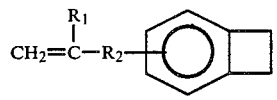

wherein $R_1$ is hydrogen or $CH_3$, $R_2$ is —(—$CH_2$—)$_n$—, and n is 0 to 6.

2. The copolymer of claim 1 wherein said alphaomonoolefin is selected from the group consisting of ethylene, propylene, butene-1, 4-methyl-1-pentent and mixtures thereof.

3. The copolymer of claim 2 wherein said alpahmonoolefin is propylene.

4. The copolymer of claim 2 wherein said alphamonoolefin includes ethylene and propylene.

5. The copolymer of claim 1 wherein $R_1$ is hydrogen and n is 0 to 2.

6. The copolymer of claim 1 wherein said olefinic benzocyclobutene monomer is selected from the group consisting of 4-(3-butenyl)benzocyclobutene, 3-(3-butenyl)benzocyclobutene, 4-vinylbenzocyclobutene, 3-vinylbenzocyclobutene, 4-allylbenzocyclobutene, 3-allylbenzocyclobutene.

7. The copolymer of claim 6 wherein said olefinic benzocyclobutene monomer is 4-(3-butenyl)benzocyclobutene.

8. The copolymer of claim 1 comprising 99.99 to 85 mole percent alphamonoolefin monomer and 0.01 to 15 mole percent olefinic benzocyclobutene monomer.

9. A solid copolymer having increased molecular weight or network structures prepared by heating the copolymer of claim 1 to a temperature above about 200° C.

10. A process for preparing a solid polymer comprises copolymerizing a $C_2$–$C_8$ alphamonoolefin and an olefinic benzocyclobutene monomer of the formula:

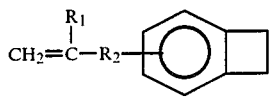

where $R_1$ is hydrogen or $CH_3$ and $R_2$ is $-(CH_2)_n-$ where n is 0 to 6, in the presence of a polyolefin coordination catalyst.

11. The process of claim 10 wherein said alphaomonoolefin is selected from the group consisting of ethylene, propylene, butene-1, 4-methyl-1-pentene and mixtures thereof.

12. The process of claim 11 wherein said alpahmonoolefin is propylene.

13. The process of claim 11 wherein said alphamonoolefin includes ethylene and propylene.

14. The process of claim 10 wherein $R_1$ is hydrogen and n is 0 to 2.

15. The process of claim 10 wherein said olefinic benzocyclobutene monomer is selected from the group consisting of 4-(3-butenyl)benzocyclobutene, 3-(3-butenyl)benzocyclobutene, 4-vinylbenzocyclobutene, 3-vinylbenzocyclobutene, 4-allylbenzocyclobutene, 3-allylbenzocyclobutene.

16. The process of claim 15 wherein said olefinic benzocyclobutene monomer is 4-(3-butenyl)benzocyclobutene.

17. The copolymer of claim 1 comprising 99.99 to 85 mole percent alphamonoolefin monomer and 0.01 to 15 mole percent olefinic benzocyclobutene monomer.

18. The process of claim 10 wherein said coordination catalyst is a titanium trichloride/trialkyl aluminum coordination catalyst.

19. The process of claim 18 wherein said coordination catalyst is a titanium trichloride/triethyl aluminum coordination catalyst.

20. The process of claim 10 wherein said coordination catalyst is a titanium trichloride/diethyl aluminum chloride coordination catalyst.

21. The copolymer of claim 1 having unreacted benzocyclobutene groups of the formula

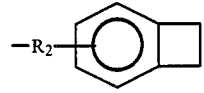

wherein $R_2$ is $-(CH_2)_n-$, and n is 0 to 6.

22. A crosslinked polymer prepared by subjecting the copolymer of claim 21 to a temperature effective for crosslinking the copolymer through the unreacted benzocyclobutene groups.

23. The crosslinked polymer of claim 22 wherein the temperature is from about 200° C. to about 300° C.

24. A copolymer as prepared in the process of claim 10.

25. A crosslinked polymer prepared by subjecting the copolymer of claim 24 to a temperature effective for crosslinking the copolymer through the unreacted benzocyclobutene groups.

26. The crosslinked polymer of claim 25 wherein the temperature is from about 200° C. to about 300° C.

27. A process for preparing a solid crystalline crosslinkable copolymer which process comprises contacting at least one $C_2$–$C_8$ alphamonoolefin and an olefinic benzocyclobutene monomer of the formula

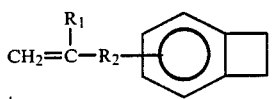

wherein $R_1$ is hydrogen or $CH_3$, $R_2$ is $-(CH_2)_n-$, and n is 0 to 6, in the presence of a polyolefin coordination catalyst and under conditions suitable to prepare a polyolefin having an unreacted benzocyclobutene group.

28. The process of claim 27 wherein the alphamonoolefin is selected from the group consisting of ethylene, propylene, butene-1, 4-methyl-1-pentene and mixtures thereof.

29. The process of claim 28 wherein the alphamonoolefin is propylene.

30. The process of claim 27 wherein the alphamonoolefin includes ethylene and propylene.

31. The process of claim 27 wherein $R_1$ is hydrogen and n is 0 to 2.

32. The process of claim 27 wherein the olefinic benzocyclobutene monomer is selected from the group consisting of 4-(3-butenyl)benzocyclobutene, 3-(3-butenyl)benzocyclobutene, 4-vinylbenzocyclobutene, 3-vinylbenzocyclobutene, 4-allylbenzocyclobutene and 3-allylbenzocyclobutene.

33. The process of claim 32 wherein the olefinic benzocyclobutene monomer is 4-(3-butenyl)benzocyclobutene.

34. The process of claim 27 wherein the polyolefin coordination catalyst is a titanium trichloride/trialkyl aluminum coordination catalyst.

35. The process of claim 34 wherein the polyolefin coordination catalyst is a titanium trichloride/triethyl aluminum coordination catalyst.

36. The process of claim 27 wherein the polyolefin coordination catalyst is a titanium trichloride/diethyl aluminum chloride coordination catalyst.

37. The process of claim 10 wherein the reaction is carried out at a temperature between about 20° C. and about 100° C.

38. The process of claim 10 wherein the reaction is carried out at a temperature between about 40° C. and about 80° C.

39. The process of claim 10 wherein the reaction is carried out in the absence of air.

40. The process of claim 27 wherein the reaction is carried out at a temperature between about 20° C. and about 100° C.

41. The process of claim 27 wherein the reaction is carried out at a temperature between about 40° C. and about 80° C.

42. The process of claim 27 wherein the reaction is carried out in the absence of air.

43. A copolymer as prepared in the process of claim 27.

44. A crosslinked polymer prepared by subjecting the copolymer of claim 43 to a temperature effective for crosslinking the copolymer through the unreacted benzocyclobutene groups.

45. The crosslinked polymer of claim 44 wherein the temperature is from about 200° C. to about 300° C.

* * * * *